United States Patent [19]

Haines

[11] 4,289,166

[45] Sep. 15, 1981

[54] CLOG-PROOF CHECK VALVE

[75] Inventor: Harold R. Haines, Utica, Mich.

[73] Assignee: The United States of America as represented by the Secretary of the Army, Washington, D.C.

[21] Appl. No.: 91,426

[22] Filed: Nov. 5, 1979

[51] Int. Cl.³ .............................................. F16K 15/14
[52] U.S. Cl. ................................................... 137/846
[58] Field of Search ........................ 137/846, 847, 848

[56] References Cited

U.S. PATENT DOCUMENTS

| | | | |
|---|---|---|---|
| 3,245,428 | 4/1966 | Klimak et al. | 137/849 X |
| 3,463,159 | 8/1969 | Heimlich | 137/846 |
| 3,465,595 | 9/1969 | Tansony | 137/846 X |
| 3,896,849 | 7/1975 | Ervin et al. | 137/847 |
| 4,053,084 | 10/1977 | Anderson | 137/849 X |

Primary Examiner—William R. Cline
Attorney, Agent, or Firm—Peter A. Taucher; John E. Becker; Nathan Edelberg

[57] ABSTRACT

Drain/check valve of soft elastomer for floor of vehicle, resembles a mushroom. Top surface of mushroom head has radial grooves. Central passage through head terminates in a tapered flat edge of mushroom stem which is normally closed. Head is peripherally grooved in grommet-like fashion to yieldably accept edges of hole-defining floor surface or similar panel. With valve in place, elastomer between radial grooves extends radially inward beyond walls of passage below head, thus forming narrowest part of passageway. Passage diverges downward, when wide open, and passage in its preformed state is progressively larger in overall perimeter and towards the terminal lower end thereof.

7 Claims, 8 Drawing Figures

CLOG-PROOF CHECK VALVE

The invention described herein may be manufactured, used, and licensed by or for the Government for governmental purposes without payment to me of any royalty thereon.

BACKGROUND AND PRIOR ART

Military vehicles must be functional in the rain, and some are amphibious. Accumulations of water must be drained, but drains must keep out water when the vehicle swims.

Applicant and patent counsel know of no prior art pertinent to the claimed invention of this application. Drain and check valves of the known prior art are subject to clogging. Military vehicles should provide for automatic draining of water by means of a check valve which will not clog and which will not admit water when the vehicle must swim.

INVENTION SUMMARY

It is accordingly an object of this invention to provide a drain/check valve, especially one for the floor of a vehicle, which is not likely to clog. The object is accomplished by using a soft elastomer in the general shape of a mushroom of which the stem tapers downward to a flat edge.

The mushroom head is peripherally grooved to receive the edge of the hole in the floor. The upper surface of the head is radially grooved. When the valve is in place, elastomer at the upper surface between the radial grooves extends radially inward beyond the wall of that portion of the central passage below the radial grooves. The stem's lower, flat, edge is normally closed, but when it is wide open, the central drain passage diverges downward from the upper surface of the head continuously to the bottom end of the stem. Such divergence is significant in that any object which can get through the upper surface of the head encounters ever widening drain passage cross-sections and thus will not become wedged ("get stuck") in the drain passage, because it does not have to rely upon any circumferential stretching of the passageway.

IN THE DRAWINGS

Figure 1:
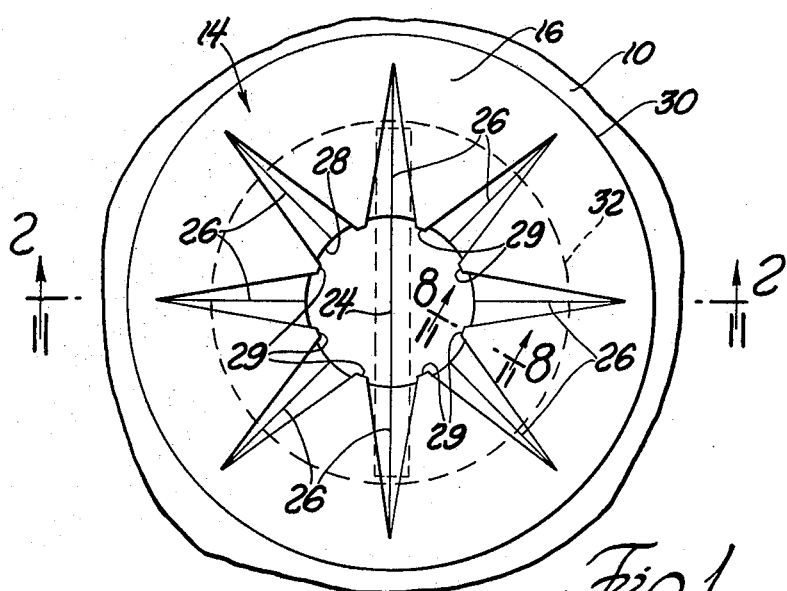
FIG. 1 is a top plan view of a valve embodying this invention, shown in place in an opening in a surface to be drained by the valve.
Figure 2:
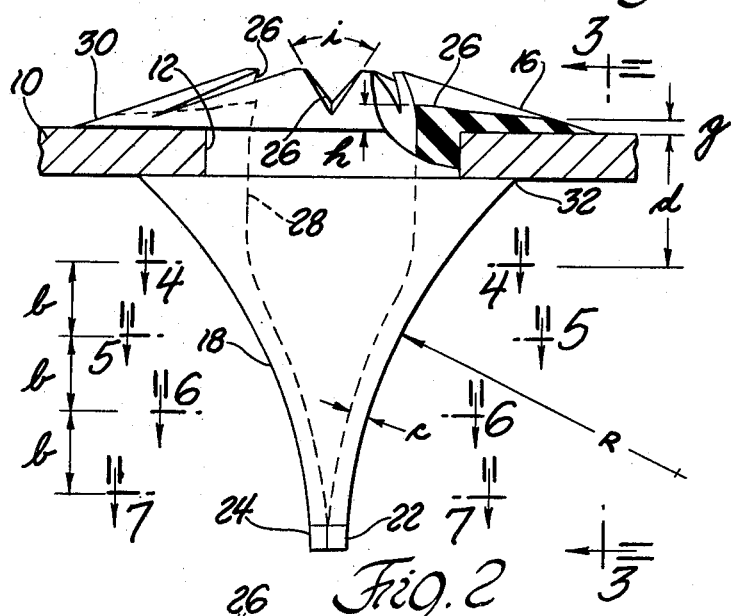
FIG. 2 is a view in section substantially on the plane of line 2—2 of FIG. 1; it is noted that the drained surface is sectioned as stated, but that only a portion of the valve is sectioned.
Figure 6:
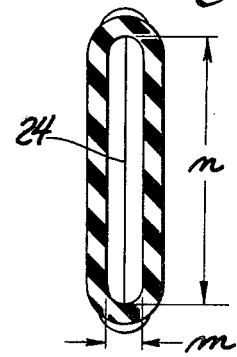
Figure 7:
Figure 8:

FIGS. 4, 5, 6, and 7 are views in section substantially on the planes of lines 4—4, 5—5, 6—6, and 7—7, respectively of FIG. 2; and FIG. 8 is a view in section substantially on the plane of lines 8—8 of FIG. 1.

DETAILED DESCRIPTION

A piece of sheet material, i.e., a panel, is shown at 10, cross-hatched as metal, which represents the floor or deck of a military vehicle exposed to precipitation which is likely to be retained as liquid water unless provision is made to drain off the liquid. An opening 12 in the panel or sheet 10 is provided for the support of a suitable drain/check valve 14.

Figure 3:
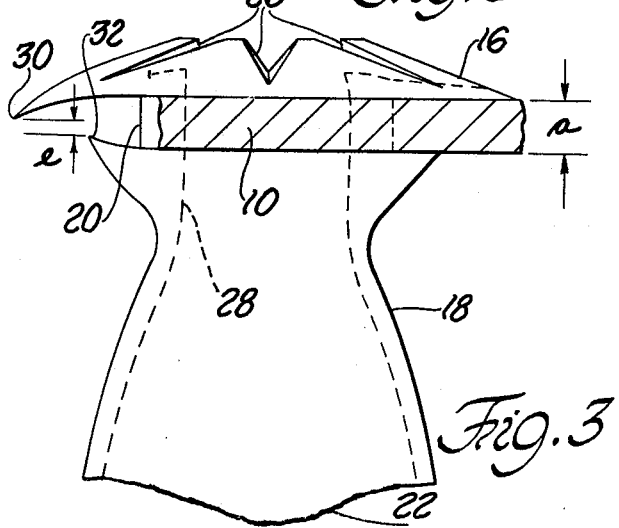
FIG. 3 is a view substantially from the plane of line 3—3 of FIG. 2, being a section through the drained surface on that line, with the leftmost portion of the surface broken away to show the leftmost edge of the valve in the configuration assumed by the elastomer in its free state.

As can be seen from FIGS. 1–3, valve 14 generally resembles a mushroom, having a head 16 and a stem 18. Head 16 is peripherally grooved as shown at 20 (FIG. 3) in order to accommodate the edge which defines opening 12 in panel or sheet 10. As seen in FIG. 2, stem 18 tapers to an elongated flat edge 22 which is normally closed along a line 24.

The upper surface of head 16 is preferably convex and is grooved, in keeping with the object of providing a drain/check valve which will not clog. In the illustrated preferred embodiment, eight such grooves 26 are shown.

A substantially vertical drain passage 28 is provided, centered in head 16 and terminating at the closure line 24 in the tapered flat edge 22. As the preferred best mode here shown indicates, the extreme upper surface of head 16 is designed so that when valve 14 is in place as in FIG. 2, the tips 29 of elastomeric material between grooves 26 extend radially inward beyond the wall of passage 28. This is better seen in the detail of FIG. 8, and it is noted that these inwardly displaced tips 29 thus effectively constitute the narrowest part of the entry end of the drain valve. When valve 14 is not in place and peripheral groove 20 engages nothing, as shown at the leftmost edge of FIG. 3, the two lips 30 and 32 of groove 20 are free to approach each other as shown in the left-hand portion in FIG. 3.

In the thus indicated free state of the elastomeric substance making up the valve, the tips 29 are drawn radially outward by the downward flexing of the upper lip 30, as seen in the left-hand portion in FIG. 3. The significant point is not how much the tips 29 are withdrawn when the elastomer assumes its free state, but the fact that, with valve 14 in place, tips 29 are displaced radially inward as indicated above. This is better seen in FIGS. 1 and 8.

Figure 4:

In the sense in which the term "taper" in its various applications is herein used as applying to the tapered stem 18 and the tapered passage inside the valve (the "passage" as a whole being shown as 28), the "taper" is deemed to begin, in terms of liquid flow, at the plane of line 4—4, FIG. 2, where the cross-section, FIG. 4, shows the passage as being substantially circular. From that plane downward, in the free state of the valve body, the passage tapers toward the closure line 24 in the elongated tapered edge 22.

The matter is discussed as length because it is important that the drain/check valve of this invention be as clog-free as possible. To achieve that objective, the taper as seen in FIG. 3 must diverge downward, without circumferential stretching, at a rate which more than offsets the narrowing effect of the taper as seen in FIG. 2, so that, from the plane of line 4—4 downward, the cross sectional areas, when the soft elastomer is opened wide, are constantly increasing as the flow moves toward discharge from the very edge 22.

In view of the foregoing, if a solid impurity is entrained by the liquid escaping into drain passage 28, the narrowest diameter it will encounter is the one defined by the tips 29 at the orifice, namely the opening at the extreme upper surface of head 16. If an entrained solid can get through the opening defined by tips 29, there is little likelihood of it becoming wedged or stuck in the remainder of the drain passage.

It will of course be understood by those skilled in the art that a valve as herein disclosed and claimed may be made of any of a variety of soft elastomers and in any of a variety of sizes. However, in order to show that the proposed invention actually is feasible, I here disclose dimensions of a valve which I have made of a material in accordance with military specification MIL-R-3065 which is commercial Neoprene SC 310 having a 30 Durometer hardness and a tensile strength of 1000 psi.

The diameter of the mushroom head at the lip 30 is 1.00 inch and at lip 32 is 0.70 inch. The diameter of the valve at groove 20 is 0.530 inch and the groove width, dimension a, is 0.100 inch. The head thickness from the extreme upper surface of head 16 to the top of sheet material 10 is 0.13 inch, with the valve in place. Concerning the dimension a (groove width), it is contemplated that a valve having a groove 0.100 inch wide will accommodate panels ranging from 0.075 to 0.120 inch thickness. Other dimensions are as follows, the unit being the standard U.S. inch unless otherwise indicated:

a=0.100
b=0.15
c=0.035
d=0.25
e=0.06
f=0.65
g=0.030
h=0.060
i=72°
j=0.32
k=0.17
l=0.42
m=0.07
n=0.49
o=0.01
p=0.54
R=1.00

To be sure each of the above dimensions is fully comprehended, the following brief explanation of each dimension is provided.

The a dimension, 0.100 inch, is explained above, and is the thickness of the panel which is drilled (or otherwise perforated) and fitted with a valve incorporating the invention here disclosed and claimed.

The vertical spacing between lines 4—4 and 5—5; 5—5 and 6—6; 6—6 and 7—7, identified by the letter b, is 0.15 inch.

Elastomer thickness c in the mushroom stem is 0.035. Line 4—4 is below the underside of lip 30 by a distance d, 0.25 inch.

When the valve is not in place so that the elastomer is unconstrained, the vertical distance e between lips 30 and 32 is 0.06 inch. The length f of stem 18 (at each vertical edge) below the lower surface of panel 10 is 0.65 inch.

For this discussion of the drain grooves 26 in the upper surface of head 16, the structure is best shown in FIG. 2. The radially outer end of groove 26 is at a distance g, 0.030 inch, from the upper surface of panel 10; the radially inner end of groove 26 is a distance h, 0.060, above panel 10. At the radially inner end, the sides of the groove form an angle i, or 72°.

Passing now to FIGS. 4-7 inclusive, at the plane of line 4—4, drain passage 28 is substantially circular, and the diameter of the circle is j, or 0.32 inch.

Figure 5:
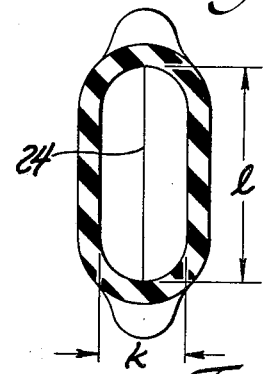

At the plane of line 4—4, moving downward, the cross section of drain passage 28 becomes increasingly elongated and narrow as shown in FIGS. 5-7. In FIG. 5, the drain passage cross section is k (0.17 inch) wide and l (0.42 inch) long. In FIG. 6 the dimensions are m, or 0.07 inch, wide and n, or 0.49 inch, long. The dimensions in FIG. 7 are o (0.01 inch) wide and p (0.54 inch) long.

The sides of stem 18 as seen in FIG. 2 are substantially circular, having a radius R of one (1.00) inch.

Regarding FIG. 8, no dimension is given for the amount that the tip extends beyond the cylindrical surface of passage 28 below grooves 26, because that amount varies with the thickness of panel 10. It suffices that, in the free state of the elastomeric valve body, the lips 30 and 32 extend toward each other as shown in FIG. 3 (left edge) and at the upper end of drain passage 28, the tips are at the circular edge instead of inward of the circular edge as seen in FIG. 1. When the valve body is in place in a panel opening 12, the thickness of the panel determines how much the lips 30 and 32 are displaced from each other, and thus determines how much the lips 29 are displaced radially inward beyond the circular edge.

OPERATION

The point is made above that a drain valve as here disclosed and claimed is at least clog-resistant because the drain passage diverges in the direction of fluid flow. Such a characteristic requires increasingly large cross-sections, or inside perimeters, which provides the desired divergence when the soft elastomer of the stem opens wide due to fluid flow. Based on the dimensions given above for FIGS. 4-7, the inside perimeters of the passage are:

| | |
|---|---|
| FIG. 4 | 1.005 inch |
| FIG. 5 | 1.034 inch |
| FIG. 6 | 1.06 inch |
| FIG. 7 | 1.091 inch |

It will thus be evident to those skilled in the art that the wide-open passage 28 diverges downward. Furthermore, the stated values prove that the passageway is of progressively increasing size, and that it does not have to rely upon any circumferential stretching of the elastomeric material to aid in assuring passage of any liquid entrained objects which once enter the passageway through the tips-restricted entry end thereof.

It will further be evident to persons skilled in the art that the closed tapered edge 22 will serve as a check valve, preventing return (upward) flow through passage 28. The elastomer in its free state is closed at the lower end 22 of stem 18. The closure line is shown at 24. When the fluid pressure inside the drain passage 28 at the lower end 22 of stem 18 is less than or equal to the pressure outside at said end 22, the end 22 will be closed to form line 24. The end 22 thus is closed during swimming of the vehicle, which makes the valve 14 a check valve as well as a drain valve.

I wish it to be understood that I do not desire to be limited to the exact details of construction shown and described for obvious modifications will occur to a person skilled in the art.

What is claimed is:

1. A clog-resistant drain valve of soft elastomeric material formed integrally with a stem and an enlarged head in a shape resembling a mushroom;
   a. the stem of the valve in its elastomeric free state tapering at a lower end to an elongated flat edge;

b. the head of the valve having a peripheral groove adapted to receive the edges of an opening in a surface to be drained by the valve;

c. a substantially vertical drain passage centered and originating in the head in substantially circular cross-sectional form, and in the free state terminating at the tapered lower end in a generally flat edge; said drain passage in said preformed free state being progressively larger in overall perimeter commencing from the beginning of the taper and going towards said terminal lower flat edge;

d. the elastomeric material being sufficiently soft to permit opening of the tapered edge for ready passage of entrained solids which would otherwise clog the drain; and e. the tapered portion of said passage when open having a preformed cross-section which progressively increases without circumferential stretching as drained refuse moves toward and passes through the extreme lower edge.

2. A valve as defined in claim 1, wherein the head is of circular convex form having a crowned upper surface and is provided with several drain grooves in its upper surface, which drain grooves separately converge toward the centered drain passage.

3. A valve as defined in claim 2, wherein each drain groove has a base which extends generally horizontally from the central drain passage radially outward to a point short of the outer periphery, and said outer periphery always being completely lower than said radially oriented drain grooves.

4. A valve as defined in claim 2 or 3, wherein for a valve installed in-place, the elastomeric material at the upper surface of the head above and between the horizontal drain grooves extends radially inward beyond the wall of that portion of the vertical drain passage which is immediately below the horizontal drain grooves.

5. A valve as defined in claim 1 or 4, wherein the installed in-place valve is closed at its lower end when the pressure inside the drain passage at said lower end is less than or equal to the pressure outside the valve at said lower end.

6. A clog-resistant drain valve of soft elastomeric material formed integrally with a stem and an enlarged head in a shape resembling a mushroom:

a. the stem of the valve in its elastomeric free state having a portion tapering at a lower end to an elongated flat edge;

b. a substantially vertical drain passage centered and originating in the head, and in said free state terminating at said tapered lower flat edge;

c. the head of said valve having a plurality of radially oriented horizontal drain grooves connecting with said centered vertical drain passage, and also having a peripheral groove adapted to receive the edges of an opening in a surface to be drained by the valve;

d. the elastomeric material being sufficiently soft to permit opening of the tapered edge for ready passage of entrained solids which would otherwise clog the drain;

e. the tapered portion of said passage when open having a preformed cross section which progressively increases as drained refuse moves toward the extreme lower edge; and f. wherein for a valve installed in-place, the elastomeric material at the upper surface of the head above and between the horizontal drain grooves extends radially inward beyond the wall of that portion of the vertical passage which is immediately below said horizontal drain grooves.

7. A valve as defined in claim 6, wherein the installed in-place valve is closed at its lower end when the pressure inside the drain passage at said lower end is less than or equal to the pressure outside the valve at said lower end.

* * * * *